(12) United States Patent
Augustine et al.

(10) Patent No.: US 9,589,053 B1
(45) Date of Patent: Mar. 7, 2017

(54) METHOD AND APPARATUS FOR CONSTRUCTING A QUERY BASED UPON CONCEPTS ASSOCIATED WITH ONE OR MORE SEARCH TERMS

(75) Inventors: David C. Augustine, Seattle, WA (US); Maggie R. Clark, Renton, WA (US); Anne Kao, Bellevue, WA (US); Stephen R. Poteet, Bellevue, WA (US); Lesley H. Quach, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/971,799

(22) Filed: Dec. 17, 2010

(51) Int. Cl.
*G06F 17/30* (2006.01)
*G06Q 30/02* (2012.01)

(52) U.S. Cl.
CPC ....... *G06F 17/30864* (2013.01); *G06Q 30/02* (2013.01)

(58) Field of Classification Search
None
See application file for complete search history.

(56) References Cited

U.S. PATENT DOCUMENTS

| 6,542,889 | B1* | 4/2003 | Aggarwal et al. |
| 7,827,125 | B1* | 11/2010 | Rennison ............ G06F 17/3066 706/14 |
| 2008/0097975 | A1* | 4/2008 | Guay ................ G06F 17/30265 |
| 2008/0104032 | A1* | 5/2008 | Sarkar ............................... 707/3 |
| 2008/0208912 | A1* | 8/2008 | Garibaldi .................... 707/104.1 |
| 2009/0055378 | A1* | 2/2009 | Alecu et al. ...................... 707/5 |
| 2009/0172514 | A1* | 7/2009 | Radovanovic .... G06F 17/30864 715/212 |
| 2009/0198674 | A1* | 8/2009 | Custis et al. ...................... 707/5 |
| 2009/0292687 | A1* | 11/2009 | Fan et al. ........................... 707/5 |
| 2010/0082333 | A1* | 4/2010 | Al-Shammari ................. 704/10 |
| 2010/0250547 | A1* | 9/2010 | Grefenstette et al. ........ 707/740 |
| 2011/0029531 | A1* | 2/2011 | Knight et al. ................ 707/737 |
| 2011/0072021 | A1* | 3/2011 | Lu ..................... G06F 17/30864 707/739 |
| 2011/0093449 | A1* | 4/2011 | Belenzon et al. ............ 707/708 |
| 2011/0302172 | A1* | 12/2011 | Chandrasekar et al. ...... 707/748 |

OTHER PUBLICATIONS

U.S. Appl. No. 12/686,653, filed Jan. 13, 2010; In re: Augustine et al., entitled *Method, Apparatus and Computer Program Product for Identifying a Standard Name Within a Data Record.*

* cited by examiner

*Primary Examiner* — Rehana Perveen
*Assistant Examiner* — Raheem Hoffler
(74) *Attorney, Agent, or Firm* — Alston & Bird LLP

(57) ABSTRACT

A method and apparatus are provided to efficiently generate a fulsome query in order to increase the recall and/or precision provided by the search. A method may construct a query by receiving the one or more initial search terms and then defining a concept for each search term. In order to define a concept, the method may determine if a concept associated with a respective search term has been previously defined. In an instance in which a concept associated with a respective search term has been previously defined, the method at least initially utilizes the previously defined concept. However, in an instance in which a concept associated with a respective search term has not been previously defined, the method constructs the concept based on terms related to the respective search term. The method may then combine the concepts defined for the one or more search terms to generate the query.

20 Claims, 7 Drawing Sheets

Enter a word or part of a word: [         ] [Find words] [Start Over] [Help]

Words Found: [CRUISE,LEVEL,FUEL,TANK]

| Query Builder | CRUISE | LEVEL | FUEL | TANK |

FUEL

This is your list. Populate by clicking the plus(+) sign next to each word in the list below.

Select a plus sign to add to your list. Select a hyperlink to get a context example(s) on that word.

| Begins With | | Contains | | Ends With | | Fuzzy Match | | Associated Words | | Associated Verbs | |
|---|---|---|---|---|---|---|---|---|---|---|---|
| Add Word | Freq | Add Word | Freq | Add Word | Freq | Add Word | Freq | Add Word | Freq | Add Word | Freq |
| ⊕ fuel | 27925 | ⊕ refueling | 653 | ⊕ refuel | 282 | ⊕ fuels | | ⊕ engine | 21518 | ⊕ replaced | 10353 |
| ⊕ fueling | 765 | ⊕ refueled | 289 | ⊕ defuel | 90 | ⊕ fueled | | ⊕ tank | 11571 | ⊕ returned | 6264 |
| ⊕ fueled | 328 | ⊕ defueled | 63 | ⊕ thefuel | 24 | ⊕ fu | | ⊕ found | 9496 | ⊕ dumped | 4230 |
| ⊕ fueler | 321 | ⊕ defueling | 43 | ⊕ enginefuel | 24 | ⊕ fueling | | ⊕ pump | 9388 | ⊕ landed | 4130 |
| ⊕ fuelers | 89 | ⊕ refueling | 42 | ⊕ offuel | 17 | | | ⊕ name | 7966 | ⊕ checked | 3668 |
| ⊕ fuelr | 61 | ⊕ refueler | 25 | ⊕ andfuel | 17 | | | ⊕ fight | 7664 | ⊕ removed | 3654 |
| ⊕ fuelcontrol | 44 | ⊕ overfueled | 19 | ⊕ de-fuel | 13 | | | ⊕ crew | 7627 | ⊕ performed | 2353 |
| ⊕ fuelpump | 29 | ⊕ re-fueling | 15 | ⊕ dumpedfuel | 12 | | | ⊕ landing | 7219 | ⊕ noted | 2176 |
| ⊕ fuelflow | 25 | ⊕ refuelled | 11 | ⊕ replacedfuel | 11 | | | ⊕ eng | 7184 | ⊕ reported | 2045 |
| ⊕ fuel-oil | 25 | ⊕ de-fueling | 9 | ⊕ nofuel | 9 | | | ⊕ lbs | 6702 | ⊕ declared | 1870 |
| ⊕ fuelwas | 23 | ⊕ refuelers | 9 | ⊕ 2fuel | 8 | | | ⊕ fit | 6685 | ⊕ diverted | 1785 |
| ⊕ fueltank | 18 | ⊕ de-fueled | 8 | ⊕ drivenfuel | 7 | | | ⊕ leak | 5482 | ⊕ accomplished | 1721 |
| ⊕ fuels | 17 | ⊕ refueller | 7 | ⊕ rtfuel | 6 | | | ⊕ valve | 5450 | ⊕ failed | 1654 |
| ⊕ fueler's | 16 | ⊕ overfueling | 5 | ⊕ engfuel | 6 | | | ⊕ wing | 5402 | | |
| ⊕ fuelfilter | 14 | ⊕ misfueled | 5 | ⊕ foundfuel | 6 | | | ⊕ control | 5400 | | |

FIG. 2

Enter a word or part of a word: [_____] [Find words] [Start Over] [Help]  Words Found: LIGHT,WIND,PRESS

| Query Builder | LIGHT | WIND | PRESS |

LIGHT

This is your list. Populate by clicking the plus(+) sign next to each word in the list below.
lights,light,lite,lites,lighted,emergencylight,relighted,unlighted,light's,li,lighted

[42]

Select a plus sign to add to your list. Select a hyperlink to get a context example(s) on that word.

| Begins With | | Contains | | Ends With | | Fuzzy Match | | Associated Words | | Associated Words | |
|---|---|---|---|---|---|---|---|---|---|---|---|
| Add Word | Freq | Add Word | Freq | Add Word | Freq | Add Word | Freq | Add Word | Freq | Add Word | Freq |
| ⊕ light | 114504 | ⊕ slightly | 3383 | ⊕ flight | 134551 | ⊕ lights | | ⊕ emergency | 77950 | ⊕ replaced | 58184 |
| ⊕ lights | 45734 | ⊕ flights | 872 | ⊕ in-flight | 6941 | ⊕ reading | | ⊕ name | 68794 | ⊕ checked | 25170 |
| ⊕ lighting | 11208 | ⊕ flightstar | 207 | ⊕ inflight | 4681 | ⊕ lights | | ⊕ name | 63134 | ⊕ illuminated | 23320 |
| ⊕ lightning | 3485 | ⊕ flightcrew | 154 | ⊕ preflight | 4535 | ⊕ lite | | ⊕ best | 53707 | ⊕ removed | 18553 |
| ⊕ lightening | 1006 | ⊕ emergencylights | 130 | ⊕ relight | 2819 | ⊕ lighting | | ⊕ gear | 48519 | ⊕ returned | 14094 |
| ⊕ lighted | 311 | ⊕ highlighted | 100 | ⊕ flashlight | 2109 | ⊕ lat | | ⊕ found | 34820 | ⊕ landed | 10216 |
| ⊕ lightly | 159 | ⊕ flashlights | 90 | ⊕ daylight | 880 | ⊕ lites | | ⊕ check | 34033 | ⊕ remained | 8890 |
| ⊕ lightassembly | 132 | ⊕ highlights | 62 | ⊕ pre-flight | 626 | ⊕ lightest | | ⊕ door | 30229 | ⊕ red | 7528 |
| ⊕ lighter | 129 | ⊕ unlighted | 56 | ⊕ relight | 513 | ⊕ lightening | | ⊕ exit | 28751 | ⊕ revamped | 6556 |
| ⊕ lightillumlnated | 100 | ⊕ flightreturned | 54 | ⊕ floodlight | 313 | ⊕ lighted | | ⊕ battery | 27500 | ⊕ performed | 6273 |
| ⊕ lightbattery | 67 | ⊕ andlights | 50 | ⊕ post-flight | 213 | ⊕ ligb | | ⊕ maintenance | 27362 | ⊕ reported | 5850 |
| ⊕ lightword | 63 | ⊕ flights | 42 | ⊕ emergencylight | 197 | ⊕ lgihs | | ⊕ normal | 77094 | ⊕ extinguished | 5300 |
| ⊕ lighter | 62 | ⊕ relighted | 36 | ⊕ postflight | 137 | ⊕ li | | ⊕ inoperative | 24785 | ⊕ repaired | 5009 |
| ⊕ lightsat | 62 | ⊕ flightlanded | 35 | ⊕ endlight | 128 | ⊕ lighter | | ⊕ system | 23360 | ⊕ scheduled | 4631 |
| ⊕ lightextinquished | 56 | ⊕ flightdeck | 35 | ⊕ highlight | 89 | | | ⊕ flight | 22721 | | |
| ⊕ lightremained | 53 | ⊕ slightest | 35 | ⊕ theflight | 69 | | | ⊕ warning | 20400 | | |
| ⊕ lightstrip | 47 | ⊕ floodlights | 34 | ⊕ thelight | 69 | | | ⊕ seat | 19880 | | |

Enter a word or part of a word: _____ [Find words] [Start Over] [Help]

Words Found: AILERON,RUDDER,YAW,DAMPER

| Query Builder | AILERON | RUDDER | YAW | DAMPER |

DAMPER

This is your list. Populate by clicking the plus(+) sign next to each word in the list below.

[ ◁ ▷ ]

Select a plus sign to add to your list. Select a hyperlink to get a context example(s) on that word.

| Begins With | | Contains | | Ends With | | Fuzzy Match | | Associated Words | | Associated Verbs | |
|---|---|---|---|---|---|---|---|---|---|---|---|
| Add Word | Freq | Add Word | Freq | Add Word | Freq | Add Word | Freq | Add Word | Freq | Add Word | Freq |
| ⊕ damper | 1617 | ⊕ yawdampers | 2 | ⊕ yawdamper | 13 | ⊕ damner | 1 | ⊕ yaw | 2335 | ⊕ replaced | 885 |
| ⊕ dampers | 125 | | | ⊕ doordamper | 1 | ⊕ dam | 1 | ⊕ rudder | 972 | ⊕ removed | 383 |
| ⊕ dampercoupler | 2 | | | ⊕ door-damper | 1 | ⊕ dampers | 1 | ⊕ name | 592 | ⊕ returned | 254 |
| ⊕ damper's | 2 | | | ⊕ elevatordamper | 1 | | | ⊕ fit | 559 | ⊕ turned | 239 |
| ⊕ damperemergency | 2 | | | ⊕ ofdamper | 1 | | | ⊕ off | 538 | ⊕ affected | 209 |
| ⊕ damper- | 1 | | | ⊕ serviceddamper | 1 | | | ⊕ flight | 437 | ⊕ checked | 189 |
| ⊕ damperjaw | 1 | | | ⊕ shimmydamper | 1 | | | ⊕ found | 424 | ⊕ performed | 173 |
| ⊕ damperinspected | 1 | | | ⊕ upstopdamper | 1 | | | ⊕ coupler | 421 | ⊕ landed | 156 |
| ⊕ damperleaking | 1 | | | ⊕ vibrationdamper | 1 | | | ⊕ landing | 407 | ⊕ uncommanded | 151 |
| ⊕ damperleft | 1 | | | ⊕ yaw-damper | 1 | | | ⊕ law | 333 | ⊕ experienced | 135 |
| ⊕ damperper | 1 | | | ⊕ anddamper | 1 | | | ⊕ check | 330 | ⊕ failed | 134 |
| ⊕ damperactuator | 1 | | | | | | | ⊕ left | 315 | ⊕ continued | 132 |
| ⊕ damperand | 1 | | | | | | | ⊕ maintenance | 310 | ⊕ reported | 130 |
| ⊕ damperattach | 1 | | | | | | | ⊕ system | 304 | ⊕ engaged | 111 |
| ⊕ dampercontrol | 1 | | | | | | | ⊕ crew | 296 | ⊕ disengaged | 107 |

Enter a word or part of a word:     [    ]    [Find words] [Start Over] [Help]     Words Found: [BIRD,ENG,INGEST,TAKEOFF]

| Query Builder | BIRD | ENG | DIGEST | TAKEOFF |

TAKEOFF

This is your list. Populate by clicking the plus(+) sign next to each word in the list below.
tkofs,taking off,takeoffs,pre-takeoff,t/o

[ ◁ ▷ ] ← 42

Select a plus sign to add to your list. Select a hyperlink to get a context example(s) on that word.

| Begins With | | Contains | Ends With | | Fuzzy Match | |
|---|---|---|---|---|---|---|
| Add Word | Freq | | Add Word | Freq | Add Word | Freq |
| ⊕ takeoff | 41605 | None Found | ⊕ pre-takeoff | 17 | ⊕ tkofs | 17 |
| ⊕ takeoffs | 70 | | ⊕ abortedtakeoff | 17 | ⊕ taking off | 17 |
| ⊕ takeoffand | 19 | | ⊕ aftertakeoff | 17 | ⊕ take off | 12 |
| ⊕ takeoffwas | 16 | | ⊕ attakeoff | 12 | ⊕ tookoff | 11 |
| ⊕ takeoffwarning | 11 | | ⊕ thetakeoff | 11 | ⊕ takingoff | 10 |
| ⊕ takeoff | 9 | | ⊕ ontakeoff | 10 | ⊕ tkoff | 10 |
| ⊕ takeoffpower | 9 | | ⊕ rejectedtakeoff | 10 | ⊕ take-off | 3 |
| ⊕ takeoff- | 5 | | ⊕ totalreoff | 3 | ⊕ took off | 3 |
| ⊕ takeoffaborted | 5 | | ⊕ oftakeoff | 3 | ⊕ t/o | 3 |
| ⊕ takeofffrom | 4 | | ⊕ duringtakeoff | 3 | ⊕ takesoff | 3 |
| ⊕ takeoffer | 4 | | ⊕ fortakeoff | 3 | ⊕ to | 2 |
| ⊕ takeofat | 6 | | ⊕ andtakeoff | 2 | ⊕ to | 2 |
| ⊕ takeoffwithout | 2 | | ⊕ after-takeoff | 2 | ⊕ takeoffs | 1 |
| ⊕ takeoffroll | 2 | | ⊕ togo-takeoff | 1 | ⊕ takeo | |

30 ⟶     32 ⟶     34 ⟶     36 ⟶

FIG. 5

METHOD AND APPARATUS FOR CONSTRUCTING A QUERY BASED UPON CONCEPTS ASSOCIATED WITH ONE OR MORE SEARCH TERMS

TECHNOLOGICAL FIELD

A method and apparatus are provided according to embodiments of the present disclosure for generating a query based upon one or more search terms and, more particularly, for generating a query based upon concepts associated with one or more search terms.

BACKGROUND

It is common in a variety of settings to conduct a search of free text data to identify those data records that satisfy a predefined query. These searches may be conducted of various data sources including document collections, databases or other data sources, such as those available over the Internet. Regardless of the data source, searches may be conducted to identify the data records that include one or more search terms identified by the query. The data records that are returned from a search may then be reviewed, for example, to learn more about the subject of the search.

The quality of a search may be defined by its recall and its precision. Recall relates to the number or percentage of correct answers that are returned relative to all of the correct answers within the data source(s) that are searched. Searches that identify a greater percentage of the correct answers have a greater recall. Precision relates to the number or percentage of answers that are returned that are correct. Thus, searches that provide a greater percentage of correct answers have a greater precision.

Typically, there is a tradeoff between recall and precision and depending upon the purpose of a search, it may be desirable for the search to have a greater recall, a greater precision or both. For example, it is generally desirable for the searches conducted by engineers and scientists to have a relatively high recall since the engineers and scientists are interested in all of the results from the data source that satisfy the query and not just some of the results from the data source that satisfy the query. Indeed, in contrast to a conventional Internet search in which multiple pages of search results may be returned with users typically only reviewing a few of the data records identified by the search, such as the data records from the first page or two of the search results, an engineer or scientist is more likely to review each or at least a much greater percentage of the data records identified by the search since the engineer or scientist is frequently trying to consider all the relevant information and not just a small subset of the relevant information.

The quality of search results may be limited, however, in instances in which the free text data is noisy. In this regard, data may be noisy in instances in which terms within a data record are abbreviated, misspelled or represented by an acronym. Data may also be noisy in instances in which the authors of different data records utilize different terms to represent the same or similar concepts. Moreover, users conducting a search, such as subject matter experts conducting research, may not anticipate all of the variations for a search term that may exist and may not be accustomed to constructing the complex queries that would be required in order to return all of the data records that include a search term or terms related to the search term. Thus, the recall of a search of free text data may not be as substantial as desired in instances in which the search is not structured in a manner so as to identify both the initial search terms and related terms.

BRIEF SUMMARY

A method and apparatus are therefore provided to efficiently generate a fulsome query in order to increase the recall provided by the search. In this regard, the method and apparatus of one embodiment provide for the expansion of the initial search terms in an intelligent manner based upon one or more techniques for identifying terms related to the initial search terms.

In one embodiment, a method is provided for constructing a query consisting of one or more initial search terms. The method receives the one or more initial search terms and then defines a concept for each initial search term with processing circuitry. In order to define a concept, the method of this embodiment determines if a concept associated with a respective search term has been previously defined. In an instance in which a concept associated with a respective search term has been previously defined, the method at least initially utilizes the previously defined concept. However, in an instance in which a concept associated with a respective search term has not been previously defined, the method constructs the concept based on terms related to the respective search term. The method of this embodiment then combines the concepts defined for the one or more initial search terms to generate the query.

In an instance in which a previously defined concept is at least initially utilized, the method may permit modification of the previously defined concept. In one embodiment, constructing the concept includes identifying a plurality of terms related to the respective search term and constructing the concept associated with the respective search term incorporating at least some of the terms related to the respective search term. In this regard, constructing the concept may include automatically constructing the concept associated with the respective search term incorporating at least some of the terms related to the respective search term and permitting modification of the automatically constructed concept. Alternatively, constructing the concept may include receiving input indicating the terms to be incorporated within the concept associated with the respective search term.

In an instance in which a concept associated with a respective search term has not been previously defined, the method may also store the concept associated with the respective search term that has been constructed. In one embodiment, constructing the concept may include identifying a plurality of terms related to the respective search term based upon at least one of string matching, contextual similarity, domain knowledge or co-occurrence within sample data, and constructing the concept associated with the respective search term incorporating at least some of the terms related to the respective search term.

In another embodiment, an apparatus may include processing circuitry configured to receive the one or more initial search terms and to define a concept for each initial search term. The processing circuitry may define a concept for each initial search term by determining if a concept associated with a respective search term has been previously defined. In an instance in which a concept associated with a respective search term has been previously defined, the processing circuitry may at least initially utilize the previously defined concept. However, in an instance in which a concept associated with a respective search term has not been previously defined, the processing circuitry may construct the concept based on terms related to the respective search term. After having defined a concept for each initial search term, the processing circuitry may combine the concepts defined for the one or more initial search terms to generate the query.

The processing circuitry may be configured to at least initially utilize the previously defined concept by permitting modification of the previously defined concept. In one embodiment, the processing circuitry is configured to construct the concept by identifying a plurality of terms related to the respective search term and constructing the concept associated with the respective search term incorporating at least some of the terms related to the respective search term. The processing circuitry may be configured to construct the concept by automatically constructing the concept associated with the respective search term incorporating at least some of the terms related to the respective search term and permitting modification of the automatically constructed concept. Alternatively, the processing circuitry may be configured to construct the concept by receiving input indicating the terms to be incorporated within the concept associated with the respective search term.

In an instance in which a concept associated with a respective search term has not been previously defined, the processing circuitry may be further configured to store the concept associated with the respective search term that has been constructed. The processing circuitry of one embodiment may be configured to construct the concept by identifying a plurality of terms related to the respective search term based upon at least one of string matching, contextual similarity, domain knowledge or co-occurrence within sample data and then constructing the concept associated with the respective search term incorporating at least some of the terms related to the respective search term.

In a further embodiment, a method for constructing a query consisting of one or more search terms includes receiving the one or more search terms and identifying, with processing circuitry, a plurality of terms related to a respective search term based upon at least one of string matching, contextual similarity, domain knowledge or co-occurrence within sample data. The method of this embodiment also constructs a concept associated with the respective search term incorporating at least some of the terms related to the respective search term and then combines the concepts constructed for the one or more initial search terms to generate the query.

The method may identify a plurality of terms related to a respective search term based upon regular expressions including at least one of terms having different spaces than the respective search term or terms incorporating misspellings of the respective search term. The method may also or alternatively identify a plurality of terms related to a respective search term by identifying terms beginning with, ending with or containing the respective search term.

In one embodiment, constructing the concept includes automatically constructing the concept associated with the respective search term incorporating at least some of the terms related to the respective search teen, and permitting modification of the automatically constructed concept. In another embodiment, constructing the concept includes receiving input indicating the related terms to be incorporated within the concept associated with the respective search term. The method may also include storing the concept associated with the respective search term that has been constructed.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 2 is a representative screen display of terms that are related to "fuel" as a search term that are provided in accordance with one embodiment of the present disclosure;

FIG. 3 is a representative screen display of terms that are related to "light" as a search term that are provided in accordance with one embodiment of the present disclosure;

FIG. 4 is a representative screen display of terms that are related to "damper" as a search term that are provided in accordance with one embodiment of the present disclosure;

FIG. 5 is a representative screen display of terms that are related to "take off" as a search term that are provided in accordance with one embodiment of the present disclosure;

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

A method and apparatus for constructing a query consisting of one or more initial search terms are provided according to embodiments of the present disclosure. In this regard, the query may be initiated by a user, such as a subject matter expert, an engineer, a scientist or the like, in order to identify data records within one or more data sources that include or otherwise relate to the search term(s). As described below, a user may enter the query via a user interface of a computer which then conducts or facilitates the search of one or more data sources that are in communication with or otherwise accessible to the computer to identify relevant data records. For example, the data sources may include document collections, databases or other data sources, such as those available via a network, e.g., the Internet, that include a plurality of data records having, for example, free text data.

Figure 1:
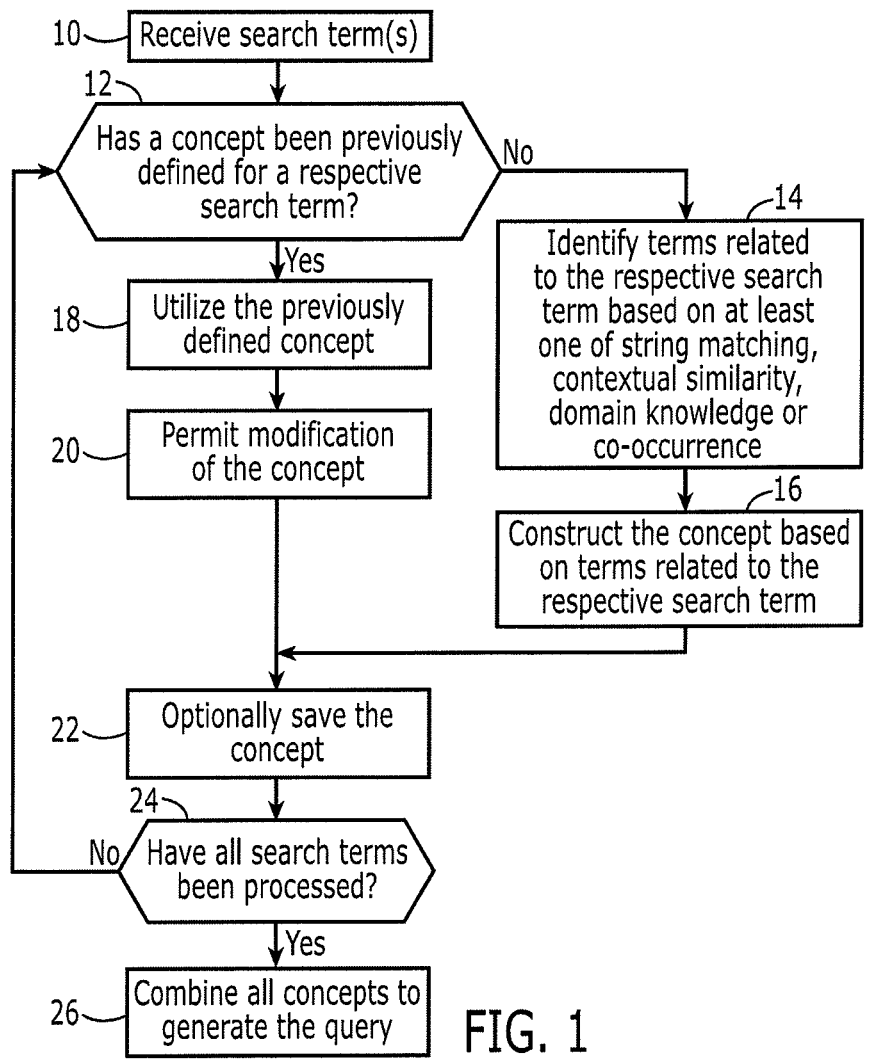
FIG. 1 is a flowchart of the operations performed in accordance with one embodiment of the present disclosure.

With reference to FIG. 1, the operations performed in accordance with one embodiment of the method and apparatus are illustrated. In this regard, one or more initial search terms are initially received at operation 10. The initial search terms may be entered by a user, such as via a user interface of a computer. By entry of the initial search terms, the user generally desires to receive search results that include the data records from the one or more data sources that include one or more of the initial search terms.

The method and apparatus of embodiments of the present disclosure may then individually analyze each initial search term in an effort to intelligently expand the initial search terms in such a manner that the recall and/or the precision of the resulting search results is increased. With respect to a respective search term, such as the first search term, it may be determined whether a concept has been previously defined for the respective search term, such as by reviewing a library of predefined concepts and associated search terms. See operation 12 of FIG. 1. As described below, a concept associated with an initial search term is a broader or expanded representation of the initial search term and may be constructed so as to identify not only those data records that include the initial search term, but also those data records that include other terms, referenced herein as "related terms", that are related to or otherwise represent the search term. As such, the recall of the search results may be increased, particularly in instances in which the data records are noisy.

In instances in which a concept has not been previously defined for a respective search term, terms related to the respective search term are identified. These related terms may be identified in various different manners as indicated by operation 14. For example, string matching techniques may be employed in order to identify terms that are related to the respective search term, such as by including many of the same letters or letter sequences as the initial search term even though there are differences, such as missing or transposed letters. In this regard, the method and apparatus may employ a variety of different string matching algorithms, such as the Levenstein and/or JaroWinkler string matching algorithms. The string matching techniques may attempt to identify related terms by analyzing the data sources or by analyzing sample data, such as sample data extracted from the data sources or other types of sample data.

Additionally or alternatively, techniques premised on contextual similarity may be employed to identify terms that are related to the respective search term. In this regard, terms that have a similar context to the respective search term may be identified, such as by a latent semantic analysis as described, for example, by U.S. Pat. No. 6,611,825 to D. Dean Billheimer, et al., the contents of which are incorporated herein by reference.

Further, terms that are related to the respective search term may also be identified based upon domain knowledge. Domain knowledge may be represented in various manners and may, for example, include lists of acronyms that are related to the respective search term, synonyms for the respective search term, abbreviations for the search term or the like. The domain knowledge may, in some embodiments, be tailored to the subject matter of the search. For example, the domain knowledge that is relied upon in a search of pharmaceutical literature may be different than the domain knowledge that is relied upon in a search of avionics-related literature since there may be different acronyms, synonyms, abbreviations or the like in the different domains.

Terms that are related to the respective search term may also be identified based on the co-occurrence of the terms with the respective search term. For example, a data set may be reviewed to determine which terms commonly occur with or otherwise accompany the respective term. In one embodiment, terms may be considered related to the respective search term if the terms appear in the same document as the respective search term for at least a predefined percentage of the documents in the data set. Alternatively, terms may be considered related to the respective search term not simply if the terms appear in the same document as the respective search term, but only if the terms appear with a predefined proximity, such as within 5 words, of the respective search term. The data set that is reviewed to identify co-occurring terms may be all or only a subset of the data records with the data source that is to be searched. Alternatively, the data set may include example or representative data records for the respective domain that may or may not be included in the data source that is to be searched.

Terms that are related to the respective search term may also or alternatively include regular expressions of the initial search term including terms having different spaces than the respective search term and/or terms incorporating misspellings of the respective search term. The regular expressions for various terms may be predefined in advance of the construction of the query.

Still further, terms that are related to the respective search term may also be identified utilizing wild cards. In this regard, terms that are related to a respective search term may include terms beginning with, ending with or containing the respective search term.

Based upon the terms that have been determined to be related to the initial search term via any one or more the above-described techniques, a concept related to the initial search term may be constructed. See operation 16 of FIG. 1. In one embodiment, the concept may be automatically constructed by associating each of the terms that have been determined to be related to the initial search term with the initial search term such that the resulting concept includes the initial search term and each of the related terms that have been determined to be related to the search term. In some, but not all, embodiments, a user may then be provided with an opportunity to selectively delete or remove one or more of the terms that have been determined to be related to the initial search term from the concept such that the user may refine the definition of the concept based on past experience or otherwise.

In an alternative embodiment, the concept is not automatically constructed, but the terms that have been determined to be related to the respective search term may be displayed. A user may then consider the related terms and may select some or all of the related terms to be associated with the initial search term in the construction of the concept.

By way of example, FIG. 2 is a representative screen display of an embodiment in which initial search terms of "cruise", "level", "fuel" and "tank" have been received. With respect to the search term "fuel", a number of terms that are related to "fuel" have been identified by several different ones of the techniques described above. As indicated by the lists designated 30, 32 and 34, terms that are related to "fuel" have been identified utilizing wild cards with separate lists being provided for terms that begin with "fuel", that contain "fuel" and that end with "fuel". Additionally, a fuzzy match list designated 36 of related terms that were identified based on their string similarity to "fuel", such as based upon the use of regular expressions or string matching techniques, is also provided. Although not illustrated in FIGS. 2-6, a list of related terms based on contextual similarity, for example as determined based on latent semantic analysis approaches, may also be provided. Further, a list of related terms that are associated with "fuel", such as those based upon co-occurrence techniques, may also be provided. Although a single list of associated terms may be provided, the associated terms may be further divided into verbs that are associated with "fuel" and other words that are associated with "fuel" as shown at 38 and 40 in FIG. 2.

As described above, the concept associated with "fuel" may be automatically constructed to include each of the related terms from each of the lists with the user then being optionally provided with an opportunity to remove one or more of the related terms from the concept. Alternatively, the concept may be constructed by the user with input being received from the user, such as via a user interface, that identifies which one(s) of the related terms to be associated with "fuel" with the concept therefore only including the related terms identified by the user. In order to assist the user in the selection of individual terms, such as for incorporation into or removal from the concept, a frequency value may be provided for some or all of the related terms. In the illustrated embodiment, the frequency value represents the number of data records in the data source or some other data sample that is to be searched that include the respective term. In one embodiment, only those terms that have a frequency greater than a predefined threshold may be identified to be related to a respective search term. Still further, the related terms may be weighted based upon the frequency value.

As another example, FIG. 3 is a representative screen display of an embodiment in which initial search terms of "light", "wind" and "press" have been received. With respect to the initial search term "light", a number of terms that are related to "light" have been identified by the techniques described above in conjunction with FIG. 2. Based on the terms that are related to "light" and that are shown in FIG. 3, a concept associated with "light" may be constructed, either automatically or based on input provided by the user, as also described above. In the illustrated embodiment, the concept associated with "light" is expressed at 42 as "lights, light, lite, lites, lighted, emergencylight, relighted, unlighted, light's, li".

FIG. 4 provides another example of a representative screen display of an embodiment in which initial search terms of "aileron", "rudder", "yaw" and "damper" have been received. With respect to the initial search term "damper", a number of terms that are related to "damper" have been identified by the techniques described above in conjunction with FIG. 2. Based on the terms that are related to "damper" and that are shown in FIG. 4, a concept associated with "damper" may be constructed, either automatically or based on input provided by the user, as also described above.

Still further, FIG. 5 is an example of yet another representative screen display of an embodiment in which initial search terms of "bird", "eng", "ingest" and "takeoff" have been received. With respect to the initial search term "takeoff", a number of terms that are related to "takeoff" have been identified utilizing regular expressions and the fuzzy match technique described above in conjunction with FIG. 2. Based on the terms that are related to "takeoff" and that are shown in FIG. 5, a concept associated with "takeoff" may be constructed, either automatically or based on input provided by the user, as also described above. In the illustrated embodiment, the concept associated with "takeoff" is expressed at 42 as "tkofs, taking off, takeoffs, pre-takeoff, t/o".

While the initial search terms of the foregoing examples include a number of different terms, the initial search terms may include multiple related terms. For example, instead of simply including "takeoff" as an initial search terms, the initial search terms may include additional terms, such as those based on acronyms or synonyms, such as "rto" for "rejected takeoff", or "aborted" for "rejected". The user may enter these various different forms of and related terms for "takeoff" as initial search terms based upon their experience or based upon the related terms that are identified by the method and apparatus of one embodiment of the present disclosure. Thus, although described herein in the context of a search in which the initial search terms are provided upfront and the corresponding concepts are then defined, the method and apparatus of one embodiment may be more iterative with the user providing additional search terms after having reviewed, for example, the related terms that were identified based upon the initial search terms.

As described above in conjunction with operation 12 of FIG. 1, a determination is initially made as to whether a concept has been previously defined for a respective search term. For example, a library may be maintained of predefined concepts and their associated search terms. Thus, the library may be searched for the respective search term to determine if a concept has been previously defined for the search term. In an instance in which it is determined that a concept has been previously defined for the respective search term, such as by locating the concept associated with the respective search term within a library of predefined concepts, the predefined concept may be utilized in order to expand upon the respective search term. See operation 18 of FIG. 1. In one embodiment, the predefined concept may then be displayed to the user and the user may be permitted to modify the concept, such as by adding additional terms or removing terms. See operation 20. For example, input may be received from the user indicating the terms, if any, of the predefined concept to be removed and/or the terms, if any, to be added to the predefined concept. By permitting the user to add or remove related terms, the precision of the subsequent search results may be improved.

Regardless of the technique by which the concept is constructed, the concept may be optionally stored in associated with the respective search term. See operation 22. In this regard, the concept may be stored in one embodiment in a library of predefined concepts with an indication of the associated search term.

A determination may then be made at operation 24 as to whether all of the initial search terms have been processed in regards to the construction of concepts. If not, the foregoing process may be repeated as shown in FIG. 1 so as to construct another concept for another one of the initial search terms.

If, however, all of the initial search terms have been processed in regards to the construction of concepts, the concepts associated with the initial search term(s) may be combined so as to generate the query. See operation 26. The concepts associated with the initial search terms may be combined in any of a variety of manners. For example, each of the concepts may be joined conjunctively such that a data record would need to satisfy each of the concepts, such as by including terms from each of the concepts, in order to be returned in the search results. Alternatively, each of the concepts may be disjunctively joined such that a data record would only need to satisfy one of the concepts, such as by including a term from any one of the concepts, in order to be returned in the search results. In another embodiment, some of the concepts may be combined conjunctively and the remainder of the concepts may be combined disjunctively in order to generate the query. In addition to simply joining the concepts conjunctively or disjunctively, the concepts may be combined with other constraints placed upon the resulting query. For example, proximity-based constraints may be placed upon two or more of the concepts, such that terms of the two or more concepts must appear within a predefined number of words from one another or, alternatively, must appear but not within a predefined number of words from one another. As another example, constraints based on the order of the concepts may be placed upon two or more of the concepts, such that a term of one concept must appear in a predefined positional relationship, such as before or after, relative to a term of another concept. As the foregoing examples should illustrate, the concepts may be combined in a variety of manners and are not limited to those described above.

Figure 6:
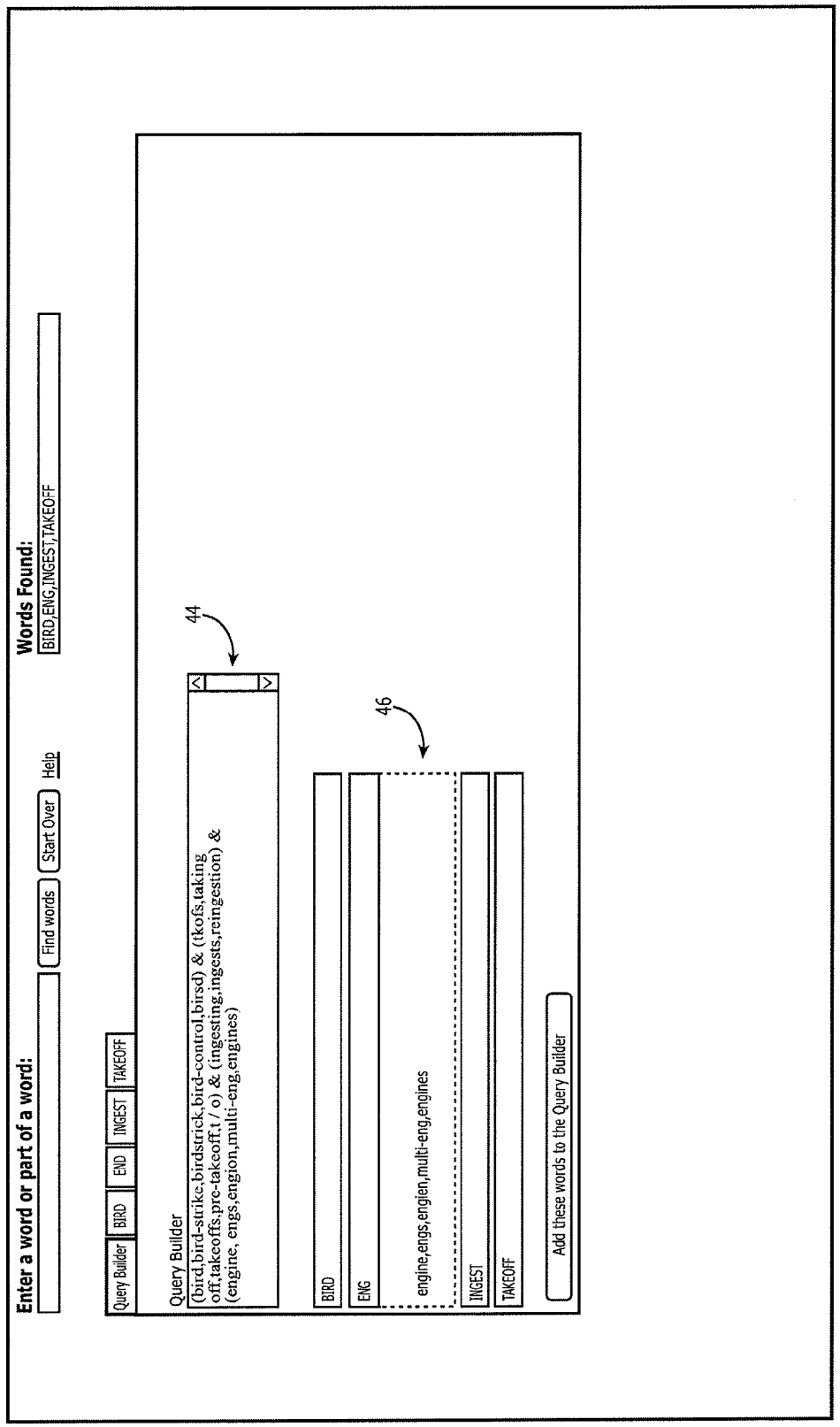
FIG. 6 is a representative screen display of a query generated in accordance with one embodiment of the present disclosure.

With reference to FIG. 6, one example of a query 44 constructed from the initial search terms "bird", "eng", "ingest" and "takeoff" is illustrated. As shown, the concept associated with "bird" is defined as "bird, bird-strike, bird-striek, bird-control, birds", the concept associated with "engine" is defined as "engine, engs, engine, multi-eng, engines", the concept associated with "ingest" is defined as "ingesting, ingests, reingestion" and the concept associated with "takeoff" is defined as "tkofs, taking off, takeoffs, pre-takeoff, t/o". As shown at 46 with respect to "eng", the concept associated with any one of the initial search terms may be displayed and may be edited, if desired, by the user. As also shown by the example of FIG. 6, the query conjunctively joins each of the four concepts such that the query is defined as the concept associated with "bird" and the concept associated with "eng" and the concept associated with "ingest" and the concept associated with "takeoff". However, the concepts may be combined differently in other embodiments, as described above.

Once the query has been constructed, the search may be conducted of the data source(s) and the records satisfying the query may be returned and optionally presented to the user. By constructing concepts associated with one or more of the search terms, the initial search terms may be expanded so that the search results include not only those data records that literally include each of the initial search terms, but also those data records that include other related terms that have been determined to be related to the search terms. Thus, the recall of the resulting search results may be increased by identifying more of the data records relevant to the search being conducted by the user, while the precision of the resulting search results may be simultaneously increased by permitting related terms to be added or deleted, either automatically or based upon user input. The search results may therefore provide additional information that may be helpful to the user and may further increase the credibility of the search and its results.

Figure 7:
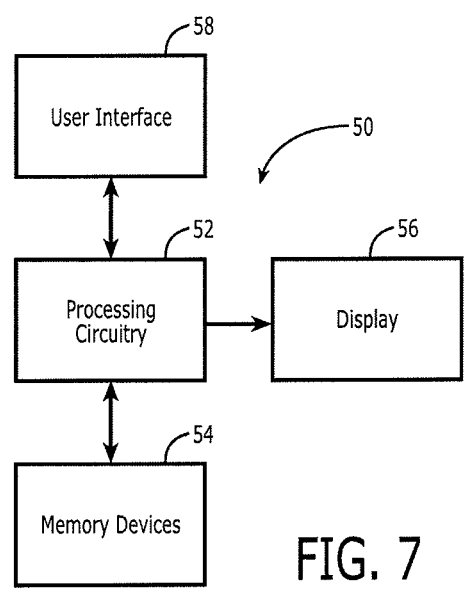
FIG. 7 is a block diagram of an apparatus for generating a query in accordance with one embodiment of the present disclosure.

The method of constructing a query in accordance with an embodiment of the present disclosure may be automated and, as such, may be implemented by a computer 50, such as depicted in FIG. 7. In this regard, the computer 50 of FIG. 7 includes processing circuitry 52 that is configured to perform data processing, application execution and other processing and management services according to an embodiment of the present disclosure. For example, the processing circuitry 52 may perform the functions identified by FIG. 1 and described above. The processing circuitry 52 may be embodied as a circuit chip (e.g., an integrated circuit chip, an application specific integrated circuit (ASIC), a field programmable gate array (FPGA) or the like) or a processor specifically configured (e.g., with hardware, software or a combination of hardware and software) to perform the operations described herein. However, in some embodiments, the processing circuitry 52 may be embodied as a portion of a server, computer, laptop, workstation, or any one or more of various other computing devices.

In one embodiment, the computer 50 of FIG. 7 also includes one or more tangible and non-transitory memory devices 54 such as, for example, volatile and/or non-volatile memory that may be either fixed or removable. The memory devices 54 may be configured to store information, data, applications, instructions or the like for enabling the processing circuitry 52 to carry out various functions in accordance with embodiments of the present disclosure. For example, the memory device 54 could be configured to buffer input data for processing by the processing circuitry 52 and to store a library of predefined concepts associated with respective search terms as described above. Additionally or alternatively, the memory device 54 could be configured to store instructions for execution by the processing circuitry 52.

The computer 50 can also include a display 56 for presenting information to the user including the various lists of related words as shown, for example, in FIGS. 2-5, the resulting query as shown, for example, in FIG. 6, and the search results. Additionally, the computer 50 can include a user interface 58 for receiving input from a user, such as the search terms, input regarding the selection or deselection of one or more related terms during the construction of a concept and interaction with search results. As such, the user interface 58 may include, for example, a keyboard, a mouse, a cursor control device, a joystick, a touch screen display, a conventional display, a microphone, a speaker, or other input/output mechanisms. As shown in FIG. 7, the display and the user interface may both be in communication with and operate under the control of the processing circuitry 52.

As noted above, the processing circuitry 52 may include a processor. The processor may be embodied in a number of different ways. For example, the processor may be embodied as various processing means such as a microprocessor or other processing element, a coprocessor, a controller or various other computing or processing devices including integrated circuits such as, for example, an ASIC, an FPGA, a hardware accelerator, or the like. In one embodiment, the processor may be configured to execute instructions stored in the memory device 54 or otherwise accessible to the processor. As such, whether configured by hardware or software methods, or by a combination thereof, the processor may represent an entity (e.g., physically embodied in circuitry) specifically configured to perform operations according to embodiments of the present disclosure. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Embodiments of method and apparatus of the present disclosure may therefore be practiced using a computer 50 such as depicted in FIG. 7. However, other embodiments may be practiced in connection with a computer program product configured to perform in accordance with embodiments of the present disclosure. In this regard, FIG. 1, as described above, is an illustration of a method and program product according to exemplary embodiments. Each operation of FIG. 1, and combinations of operations in FIG. 1, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory device 54) and executed by processing circuitry 52 (e.g., processor).

As will be appreciated, any such stored computer program instructions may be loaded onto a computer or other programmable apparatus (e.g., hardware) to produce a machine, such that the instructions which execute on the computer or other programmable apparatus implement the functions specified in the flowchart operation(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart operation(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart operation(s).

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for constructing a query comprising one or more initial search terms, the method comprising:
    receiving the one or more initial search terms;
    defining a concept for each initial search term with processing circuitry, defining a concept comprising:
        determining if a concept associated with a respective search term has been previously defined;
        when a concept associated with a respective search term has been previously defined, at least initially utilizing the previously defined concept;
    when a concept associated with a respective search term has not been previously defined, constructing the concept based on terms related to the respective search term, wherein constructing the concept comprises, prior to conducting a search of one or more data sources, identifying a plurality of terms related to the respective search term based upon string matching within sample data and constructing the concept associated with the respective search term incorporating at least some of the terms related to the respective search term that were identified based upon string matching, wherein the string matching is performed in accordance with a predefined string matching algorithm that identifies a term to be related to the respective search term comprising a plurality of letters when the term includes a plurality of the same letters or letter sequences as the search term even though the term also exhibits one or more differences including transposed letters relative to the search term; and
    combining the concepts defined for the one or more initial search terms to generate the query; and
    following construction and combining of the concepts, conducting the search of one or more data sources in accordance with the query in order to identify one or more records that satisfy the query.

2. A method according to claim 1 wherein at least initially utilizing the previously defined concept comprises permitting modification of the previously defined concept.

3. A method according to claim 1 wherein constructing the concept comprises identifying a plurality of terms related to the respective search term based upon the string matching and constructing the concept associated with the respective search term incorporating at least some of the terms related to the respective search term.

4. A method according to claim 3 wherein constructing the concept comprises:
    automatically constructing the concept associated with the respective search term incorporating at least some of the terms related to the respective search term based upon the string matching; and
    permitting modification of the automatically constructed concept prior to conducting the search of the one or more data sources.

5. A method according to claim 3 wherein constructing the concept comprises receiving input indicating the terms to be incorporated within the concept associated with the respective search term prior to conducting the search of the one or more data sources.

6. A method according to claim 5 further comprising providing a frequency value or a weight associated with each of the plurality of terms related to the respective search term to facilitate user input indicating the terms to be incorporated with the concept.

7. A method according to claim 1 wherein in an instance in which a concept associated with a respective search term has not been previously defined, the method further comprises storing the concept associated with the respective search term that has been constructed utilizing the string matching prior to conducting the search of the one or more data sources.

8. An apparatus comprising processing circuitry configured to: receive one or more initial search terms;
    define a concept for each initial search term by:
        determining if a concept associated with a respective search term has been previously defined;
        when a concept associated with a respective search term has been previously defined, at least initially utilizing the previously defined concept;
        when a concept associated with a respective search term has not been previously defined, constructing the concept based on terms related to the respective search term; and
    combine the concepts defined for the one or more initial search terms to generate the query; and
    conduct a search of one or more data sources in accordance with the query in order to identify one or more records that satisfy the query,
    wherein the processing circuitry is configured to construct the concept, prior to conducting the search of one or more data sources, by:
    identifying a plurality of terms related to the respective search term based upon string matching within sample data, wherein the string matching is performed in accordance with a predefined string matching algorithm that identifies a term to be related to the respective search term comprising a plurality of letters when the term includes a plurality of the same letters or letter sequences as the search term even though the term also exhibits one or more differences including transposed letters relative to the search term; and
    constructing the concept associated with the respective search term incorporating at least some of the terms related to the respective search term that were identified based upon string matching.

9. An apparatus according to claim 8 wherein the processing circuitry is configured to at least initially utilize the previously defined concept by permitting modification of the previously defined concept.

10. An apparatus according to claim 8 wherein the processing circuitry is configured to construct the concept by identifying a plurality of terms related to the respective search term based upon the string matching and constructing the concept associated with the respective search term incorporating at least some of the terms related to the respective search term.

11. An apparatus according to claim 10 wherein the processing circuitry is configured to construct the concept by:
automatically constructing the concept associated with the respective search term incorporating at least some of the terms related to the respective search term based upon the string matching; and
permitting modification of the automatically constructed concept prior to conducting the search of the one or more data sources.

12. An apparatus according to claim 10 wherein the processing circuitry is configured to construct the concept by receiving input indicating the terms to be incorporated within the concept associated with the respective search term prior to conducting the search of the one or more data sources.

13. An apparatus according to claim 8 wherein in an instance in which a concept associated with a respective search term has not been previously defined, the processing circuitry is further configured to store the concept associated with the respective search term that has been constructed utilizing the string matching prior to conducting the search of the one or more data sources.

14. A method for constructing a query comprising one or more initial search terms, the method comprising:
receiving the one or more initial search terms;
prior to generating a query with which to search one or more data sources, dentifying, with processing circuitry, a plurality of terms related to a respective search term based upon string matching within sample data, wherein the string matching is performed in accordance with a predefined string matching algorithm that identifies a term to be related to the respective search term comprising a plurality of letters when the term includes a plurality of the same letters or letter sequences as the search term even though the term also exhibits one or more differences including transposed letters relative to the search term;
constructing a concept associated with the respective search term incorporating at least some of the terms related to the respective search term that were identified based upon string matching; and
prior to conducting a search of one or more data sources based upon the query, combining the concepts constructed for the one or more initial search terms to generate the query.

15. A method according to claim 14 wherein identifying a plurality of terms related to a respective search term is further based upon regular expressions including at least one of terms having different spaces than the respective search term or terms incorporating misspellings of the respective search term.

16. A method according to claim 14 wherein identifying a plurality of terms related to a respective search term comprises identifying terms beginning with, ending with or containing the respective search term.

17. A method according to claim 14 wherein constructing the concept comprises:
automatically constructing the concept associated with the respective search term incorporating at least some of the terms related to the respective search term based upon the string matching; and
permitting modification of the automatically constructed concept prior to conducting the search of the one or more data sources.

18. A method according to claim 14 wherein constructing the concept comprises receiving input indicating the terms that were identified by the sting matching to be incorporated within the concept associated with the respective search term.

19. A method according to claim 14 further comprising storing the concept associated with the respective search term that has been constructed utilizing the string matching prior to conducting the search of the one or more data sources.

20. A method according to claim 14 further comprising:
determining if a concept associated with a respective search term has been previously defined;
when a concept associated with a respective search term has been previously defined, at least initially utilizing the previously defined concept.

* * * * *

UNITED STATES PATENT AND TRADEMARK OFFICE
CERTIFICATE OF CORRECTION

PATENT NO.         : 9,589,053 B1                        Page 1 of 1
APPLICATION NO.    : 12/971799
DATED              : March 7, 2017
INVENTOR(S)        : Augustine et al.

It is certified that error appears in the above-identified patent and that said Letters Patent is hereby corrected as shown below:

In the Claims

Column 13,
Line 41, "dentifying" should read --identifying--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*